2 Sheets-Sheet I

S. S. ALLEN.

Improvement in Harvesters.

No. 4,582. Reissued Oct. 10, 1871.

Geo. H. Myers
G. W. Allen
} Witnesses for S. S. Sisson

J. Snowden Bell
Wm. S. Lyman
} Witnesses for E. D. Buckman

S. S. Sisson
C. D. Buckman
} Executors

AM. PHOTO-LITHOGRAPHIC CO. N.Y. (OSBORNE'S PROCESS.)

S. S. ALLEN.

2 Sheets - Sheet 2

Improvement in Harvesters.

No. 4,582. Reissued Oct. 10, 1871.

Geo. H. Myers
G. W. Allen
Witnesses for S. A. Sisson

J. Snowden Bell
Wm. S. Lynn
Witnesses for E. D. Buckman

S. A. Sisson
E. D. Buckman
Executors

AM. PHOTO-LITHOGRAPHIC CO. N.Y. (OSBORNE'S PROCESS.)

UNITED STATES PATENT OFFICE.

E. D. BUCKMAN, OF PHILADELPHIA, PENNSYLVANIA, AND SAMUEL A. SISSON, OF HOOSICK FALLS, NEW YORK, EXECUTORS OF SAMUEL L. ALLEN, DECEASED, ASSIGNORS TO J. RUSSELL PARSONS.

IMPROVEMENT IN HARVESTERS.

Specification forming part of Letters Patent No. 16,957, dated April 7, 1857; reissue No. 4,582, dated October 10, 1871; extended seven years.

*To all whom it may concern:*

Be it known that the late SAMUEL S. ALLEN, of Bristol, Bucks county, Pennsylvania, did invent certain new and useful Improvements in Harvesters, of which the following is a full, clear, and exact description, reference being had to the accompanying drawing and to the letters of reference marked thereon.

His invention consists: First, in combining with the upper or draft-frame of a harvester, and with a lower frame, which is free to rise and fall and supports the cutting apparatus or cutters and fingers, a flexible connection which is connected with the lower frame and with the device by which the team draws the harvester, this device being free to move forward and backward relatively to the draft-frame, whereby the power exerted by the team tends to lift the lower frame, thus causing it to bear less heavily upon the ground, and, to a certain extent, obviating the the side draft, which is so oppressive in ordinary harvesters. The combination also obviates the tendency of the cutting apparatus to bury itself in the ground, which sometimes is a serious difficulty in that class of harvesters in which the lower frame drops at its forward end, a class of harvesters commonly called front-cut. And it further consists in raising the cutting apparatus to pass obstacles, the draft or power executed by the team co-operating with the force exerted by the driver. As it is expedient that harvesters should work well in all grass or grain, and as in cutting heavy lodged or matted grass the tendency to lift the cutting apparatus would be injurious, as it would increase the liability of that apparatus to run over the grass without cutting it, the said ALLEN combined with the flexible connection and the upper and the lower frames a contrivance, by means of which the driver may press the lower frame down, and this combination is the second part of his invention.

Figure 1:
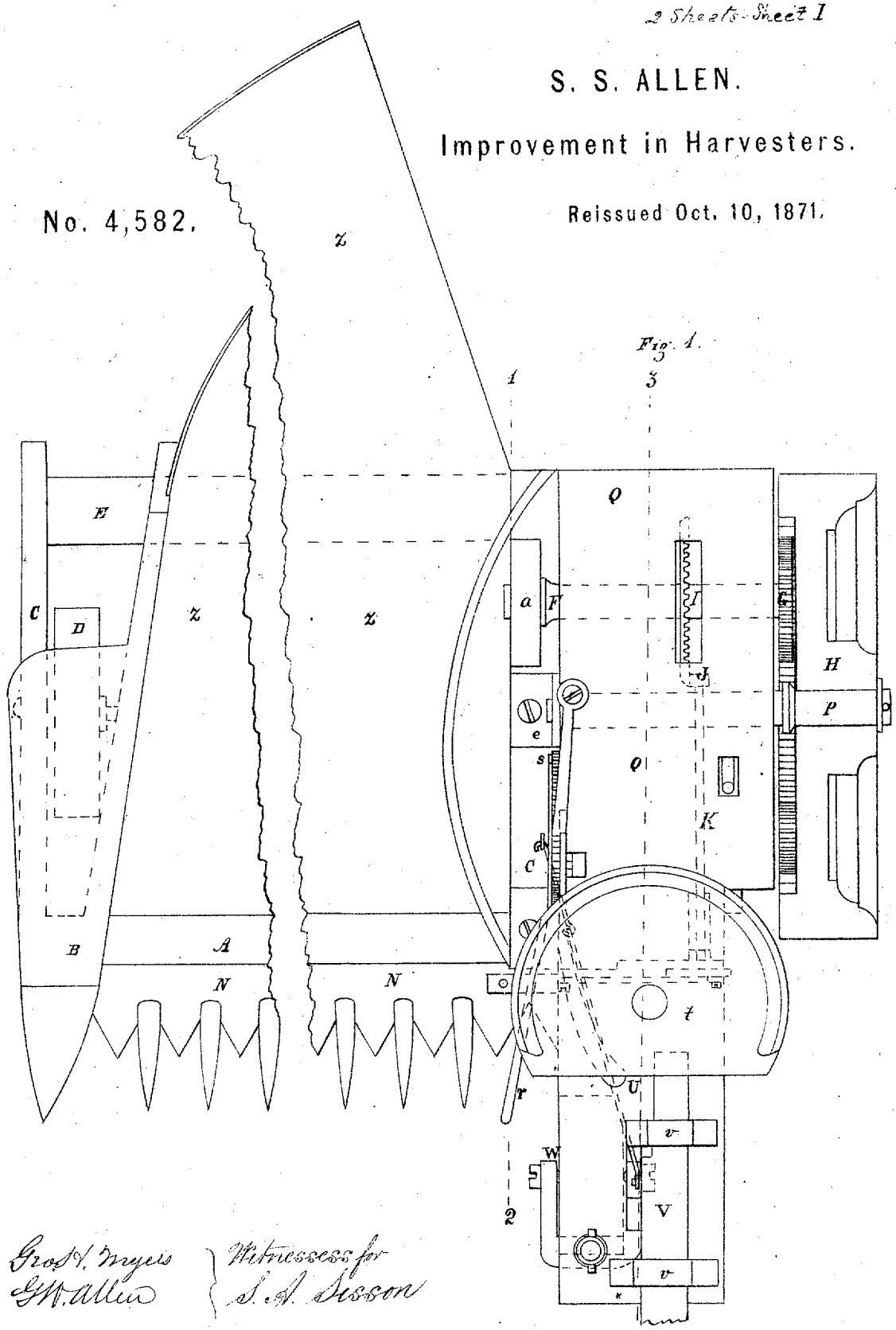
Figure 2:
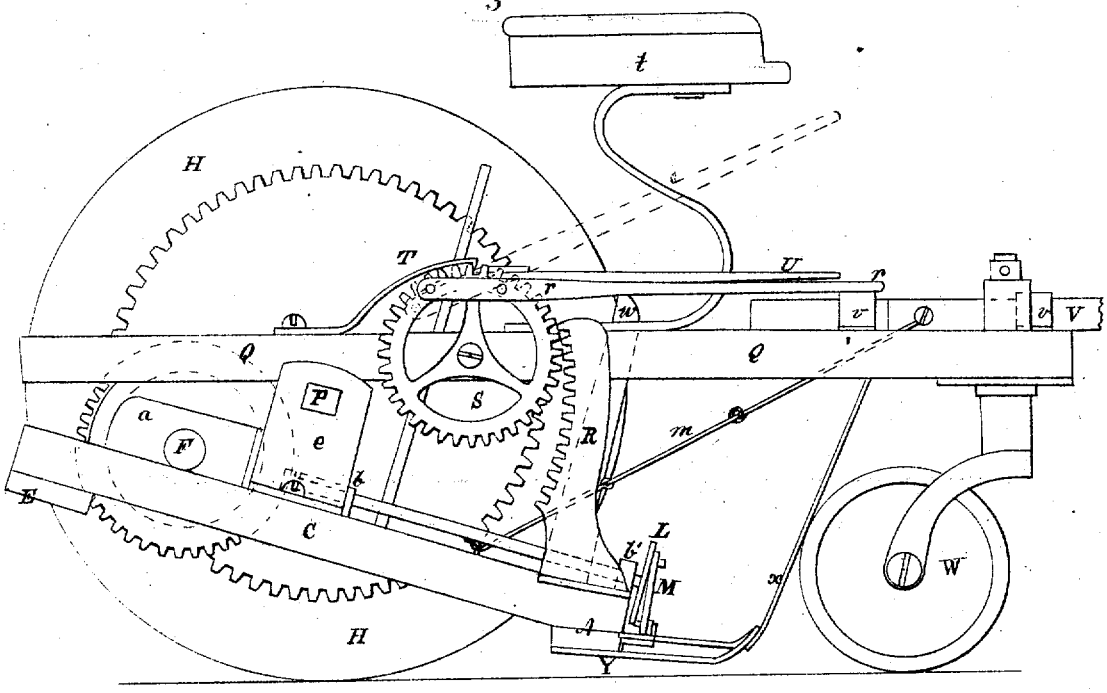
Figure 3:
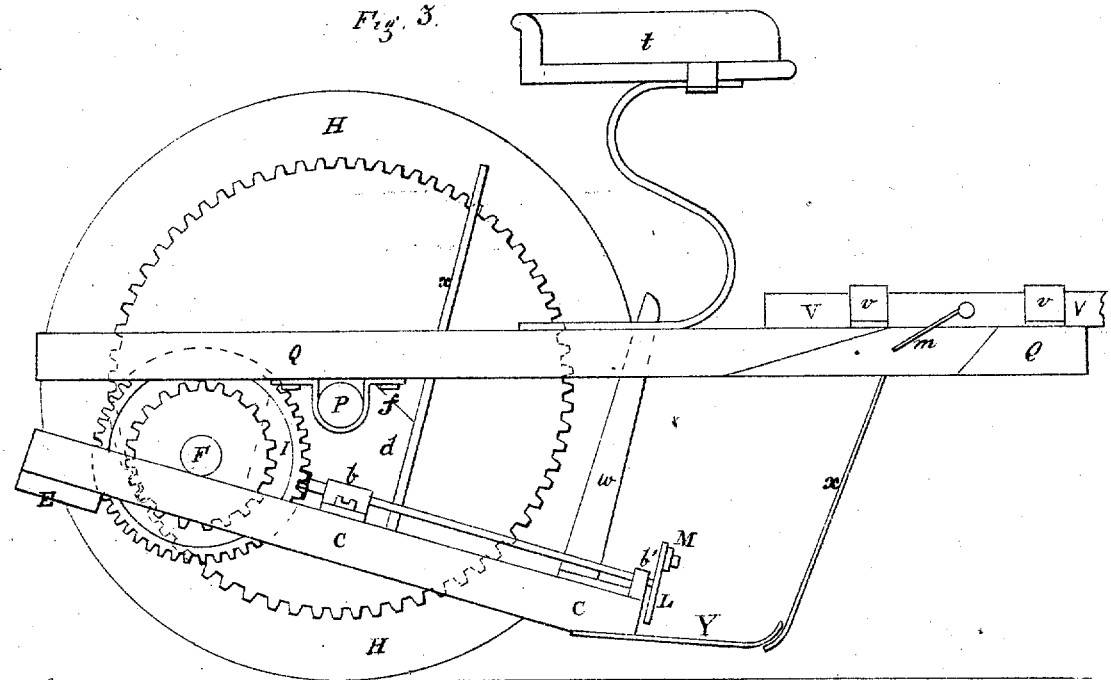

On reference to the drawing which forms a part of this specification, Figure 1 is a ground plan, showing his improvements in harvesters, the main or driving-wheel being in section. Fig. 2 is a transverse section of the same on the line 1 2, Fig. 1. Fig. 3 is also a transverse section on the line 3 4, Fig. 1.

Similar letters refer to similar parts throughout the several views.

A is the finger-bar, secured at one end to the dividing-board B, and at the other end to the framing C. The dividing-board is furnished with the usual wheel D, and extending from the board to the framing C, at the rear of the machine, is the bar E, which, with the finger-bar, serves to connect the whole firmly together. The above portion of the machine he termed the main frame or framing which supports the cutting-bar. In suitable boxes *a a* on the frame C is hung a shaft, F, on the end of which is a pinion, G, the teeth of which gear into the internal teeth of the main or driving-wheel H. On the shaft F is also secured a bevel or crown-wheel, I, which gears into a pinion, J, on the shaft K; the latter turns in boxes *b b'* on the framing C, and is furnished at the end with a crank-wheel, L, to a pin on which is attached one end of the connecting-rod M, the opposite end of the latter being connected to the cutter-bar N. P is the stationary axle for the main driving-wheel. This axle is secured at one end to a block, *d*, and at the other end to a bracket, *e*, both being secured to the lower frame which supports the cutter-bar C. Q is the upper platform or draft-frame, on the under side of which is a strap or staple, *f*, which passes round the stationary axle P, so as to form a hinge on which the main frame turns. Attached to the front end of the lower frame C is a curved rack, R, into which gears a wheel, S, hung to a pin on the edge of the upper platform Q. To the face of the wheel S is secured a lever, *r*, which is of sufficient length to be within reach of the hand of the driver on the seat *t*. T is a spring-pawl, the point of which has a tendency to pass between the teeth of the wheel S when not otherwise raised therefrom by the depression of the treadle-lever U, which is hung to a bracket on the upper platform Q in such a manner that its end bears against the under side of the spring-pawl. V is the pole of the machine, by means of which the team draws the machine, which is arranged to slide longitudinally in staples *v v* attached to the front of the upper platform, so as to be capable of moving forward and backward relatively thereto. It is also allowed to have a vertical movement. On the side of the pole, and between the two staples, is a pin, to which is connected one end of the draft-rod or chain *m*, which is the flexible connection, and which passes through the platform, takes an angular direction, as seen in dotted lines, Fig. 1, and is connected with the edge of the framing C behind the heel of the cutter-bar. In the front end of the upper platform and one side of the pole turns the caster W, the form and operation of which will be understood without further description. From the under side of the upper platform is suspended a curved iron plate, X, which, together with another curved plate, Y, attached to the under side of the cutter-bar, combine to form a shield for preventing cut grain or grass from coming in contact with the crank-wheel and impeding its operations. Z is the grain-platform, which can be removed from and reattached to the cutter-frame when it is desirable to convert the machine from a mower to a reaper, or vice versa. The proper lateral position as regards that of the upper frame is maintained on one side by the rack R, and on the opposite side by a guide-post, *w*.

As the machine is drawn over the ground motion is communicated to the shaft F from the main driving-wheel, and the necessary reciprocating motion imparted to the cutter-bar by means of the bevel-wheel I, pinion J, crank, and connecting-rod. Should the driver during the progress of the machine observe any stone or other obstruction which might act injuriously on the cutters he raises the lever, thereby turning the wheel S, raising the rack R, and with it the front edge of the main frame and its cutting apparatus, the power of the team aiding his efforts, and the spring-pawl, if permitted to act, maintaining the cutting apparatus in its elevated position. After the obstruction is passed the driver places his foot upon the treadle-lever U, thereby raising the spring-pawl free from contact with the wheel, when the front of the frame drops by its own weight to its former position. This facility of rapidly raising the cutters is also of great advantage when it is desirable to turn the machine around. In cutting matted or tangled grass it is frequently necessary that an extra pressure should be put upon the cutter-bar. This has hitherto been accomplished in mowing-machines by the driver standing directly on the bar, which not only involves the necessity of the seat being deserted, but places him in a dangerous position. The required pressure may be given to the cutter-bar in this machine by the driver simply releasing the spring-pawl and depressing the lever *r*, at the same time maintaining his position on the seat. In mowing ordinary grass the driver keeps his foot upon the treadle-lever U. The The lower frame is then free to rise and fall, and the flexible connection operates to diminish side draft by preventing the cutting apparatus from bearing upon the ground with the whole force due to its weight and that of its supporting-frame. As the pole is allowed to have a vertical movement independent of the platform it is evident that the necks of the horses must be relieved from the weight of the machine and from the shocks which occur in passing over uneven ground. By means of the plates X and Y, the end of one overlapping the other, a secure shield is afforded for the protection of the crank-wheel, no matter what the position of the upper platform Q may be in respect to that of the main frame. When the machine has to be used for reaping all that is necessary is to place the curved platform Z in its proper position on the main frame, adapt the usual reel to the machine, then raise the cutter-bar to the height required by the nature of the grain, and let the spring-pawl act to hold it in that position. Instead of removing the grain from the platform in the usual manner the said ALLEN proposed to hinge a rake to the post X, the said post being so situated as to insure the rake clearing the platform with but little exertion on the part of the operator.

What is claimed as the invention of the said ALLEN is—

1. The combination of the folllowing devices or elements, viz.: First, a draft or upper frame; second, a lower frame, free to rise and fall, and supporting the finger-bar and cutting apparatus; third, a device to which the power of the team to draw the machine is applied, and which is movable forward and backward relatively to the draft-frame; fourth, a flexible connection connected at one end with the lower frame, and at the other end with the said movable device; all these elements of a machine being and operating in combination, substantially as described.

2. In combination with the four devices or elements claimed in combination in the first claim, an apparatus, substantially as herein described, whereby the driver can press down the lower frame when mowing matted grass.

S. A. SISSON,
E. D. BUCKMAN,
*Executors of last will and testament of* S. S. ALLEN, *deceased.*

Witnesses for S. A. SISSON:
GEO. H. MYERS,
G. W. ALLEN.
Witnesses for E. D. BUCKMAN:
J. SNOWDEN BELL,
WM. S. LYNN.

(74)